United States Patent
Quinet et al.

(10) Patent No.: US 11,492,945 B2
(45) Date of Patent: Nov. 8, 2022

(54) SCR CATALYST

(71) Applicant: Umicore AG & Co. KG, Hanau-Wolfgang (DE)

(72) Inventors: Elodie Quinet, Hanau (DE); Stephan Malmberg, Frankfurt (DE); Nicola Soeger, Nidderau (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 209 days.

(21) Appl. No.: 16/763,608

(22) PCT Filed: Nov. 13, 2018

(86) PCT No.: PCT/EP2018/081077
§ 371 (c)(1),
(2) Date: May 13, 2020

(87) PCT Pub. No.: WO2019/096786
PCT Pub. Date: May 23, 2019

(65) Prior Publication Data
US 2020/0362740 A1 Nov. 19, 2020

(30) Foreign Application Priority Data
Nov. 14, 2017 (EP) .................. 17201482

(51) Int. Cl.
  *B01J 23/00*  (2006.01)
  *F01N 3/20*  (2006.01)
  *B01J 21/06*  (2006.01)
  *F01N 3/035*  (2006.01)
  *F01N 3/10*  (2006.01)
  *B01J 21/08*  (2006.01)
  *B01J 23/10*  (2006.01)
  *B01J 23/20*  (2006.01)
  *B01J 23/30*  (2006.01)

(52) U.S. Cl.
  CPC .......... *F01N 3/2066* (2013.01); *B01J 21/063* (2013.01); *B01J 23/002* (2013.01); *F01N 3/035* (2013.01); *F01N 3/106* (2013.01); *B01J 21/08* (2013.01); *B01J 23/10* (2013.01); *B01J 23/20* (2013.01); *B01J 23/30* (2013.01); *F01N 2370/02* (2013.01); *F01N 2610/02* (2013.01)

(58) Field of Classification Search
  None
  See application file for complete search history.

(56) References Cited

U.S. PATENT DOCUMENTS

| | | | |
|---|---|---|---|
| 4,378,338 A | 3/1983 | Imanari | |
| 8,975,206 B2 | 3/2015 | Schermanz | |
| 9,555,371 B2 | 1/2017 | Fisher | |
| 2007/0129241 A1* | 6/2007 | Schermanz | B01D 53/9418 502/240 |
| 2009/0060810 A1 | 3/2009 | Hong | |
| 2009/0304566 A1* | 12/2009 | Golden | B01J 37/0246 423/239.1 |
| 2012/0308459 A1 | 12/2012 | Guo | |
| 2013/0121902 A1* | 5/2013 | Adelmann | B01J 35/0006 502/65 |
| 2013/0210617 A1 | 8/2013 | Hernandez | |
| 2016/0288094 A1 | 10/2016 | Malmberg | |
| 2017/0043325 A1 | 2/2017 | Cheon | |

FOREIGN PATENT DOCUMENTS

| | | | |
|---|---|---|---|
| CN | 102614890 | * | 8/2012 |
| CN | 103240077 | * | 8/2013 |
| CN | 105562029 | * | 12/2015 |
| CN | 106215929 | A | 12/2016 |
| CN | 106732699 | * | 12/2016 |
| DE | 4314896 | A1 | 11/1993 |
| DE | 112007000814 | | 2/2009 |
| EP | 0345695 | A2 | 12/1989 |
| EP | 2700447 | A1 | 2/2014 |
| EP | 2716364 | A1 | 4/2014 |
| EP | 2875863 | A1 | 5/2015 |
| JP | 2004290753 | A | 10/2004 |
| WO | 1989003366 | A1 | 4/1989 |
| WO | 2011013006 | A2 | 2/2011 |
| WO | 2011032020 | A2 | 3/2011 |
| WO | 2012004263 | A1 | 1/2012 |
| WO | 2017101449 | A1 | 6/2017 |

OTHER PUBLICATIONS

International Search Report received in PCT/EP2018/081077, dated Dec. 19, 2018.
Written Opinion received in PCT/EP2018/081077, dated Dec. 19, 2018.
Jansson, Jonas, "Ch. 3, Vanadia-Based Catalysts for Mobile SCR", "Urea-SCR Technology for deNOx After Treatment of Diesel Exhausts, Fundamental and Applied Catalysis", 2014, Publisher: Nova and E. Tronconi (eds.), Springer Science+Business Media.
Mayer, Thorsten, "Feststoff-SCR-System auf Basis von Ammoniumcarbamat", Nov. 22, 2005, Publisher: Universitt Kaiserslautern.

* cited by examiner

*Primary Examiner* — Sheng H Davis
(74) *Attorney, Agent, or Firm* — Suzannah K. Sundby, Esq.; Canady + Lortz LLP (57) ABSTRACT

The present invention relates to a catalyst comprising at least one oxide of vanadium, at least one oxide of tungsten, at least one oxide of cerium, at least one oxide of titanium and at least one oxide of niobium, and an exhaust system containing said oxides.

15 Claims, 7 Drawing Sheets

SCR CATALYST

The present invention relates to an SCR catalyst, based upon vanadium oxide, containing niobium oxide and cerium oxide.

The exhaust gas of motor vehicles that are operated with lean-burn combustion engines, such as diesel engines, also contains, in addition to carbon monoxide (CO) and nitrogen oxides ($NO_x$), components that result from the incomplete combustion of the fuel in the combustion chamber of the cylinder. In addition to residual hydrocarbons (HC), which are usually also predominantly present in gaseous form, these also include particle emissions. These are complex agglomerates from predominantly carbonaceous particulate matter and an adhering liquid phase, which usually preponderantly consists of longer-chained hydrocarbon condensates. The liquid phase adhering to the solid components is also referred to as "Soluble Organic Fraction SOF" or "Volatile Organic Fraction VOF."

To clean these exhaust gases, the aforementioned components must be converted to harmless compounds as completely as possible, which is only possible with the use of suitable catalysts.

A well-known process for removing nitrogen oxides from exhaust gases in the presence of oxygen is selective catalytic reduction using ammonia on a suitable catalyst (SCR process). With this process, the nitrogen oxides to be removed from the exhaust gas are converted into nitrogen and water using ammonia as a reducing agent.

The so-called "standard SCR reaction" according to equation (I)

$$NH_3 + NO + 1/4 O_2 \rightarrow N_2 + 3/2 H_2O \quad (I)$$

and the so-called "fast SCR reaction" according to equation (II)

$$NH_3 + 1/2 NO + 1/2 NO_2 \rightarrow N_2 + 3/2 H_2O \quad (II)$$

were identified as significant reaction pathways of the SCR reaction.

Since the exhaust gas from lean-burn internal combustion engines usually comprises $NO_2$ only in amounts of approximately 10% of the total proportion of nitrogen oxide, it is normally desired to increase its amount in order to benefit from the fast SCR reaction. This is done, for example, by means of an upstream oxidation catalytic converter. However, depending upon the exhaust system used in the specific case, an SCR catalyst may nevertheless be confronted with quite different $NO_2/NOx$ ratios, which may range from an excess of NO to an excess of $NO_2$.

The ammonia used as a reducing agent can be made available by dosing an ammonia precursor compound such as urea, ammonium carbamate, or ammonium formate into the exhaust tract, and subsequent hydrolysis.

So-called mixed oxide catalysts, which are based upon oxides of vanadium and which generally also contain oxides of titanium and of further metals, e.g., of tungsten (see Isabella Nova and Enrico Tronconi (eds.), Urea-SCR Technology for deNOx After Treatment of Diesel Exhausts, chapter 3, Springer Verlag, 2014), may also be used as SCR catalysts.

If the nitrogen oxide contained in the exhaust gas is present or at least predominantly present in the form of NO, SCR catalysts based upon vanadium oxide are characterized by good activity and stability. However, in the case of $NO_2$ excess, they show a clear loss in activity. Although the addition of cerium oxide to the vanadium oxide-based SCR catalysts improves activity in case of $NO_2$ excess, it also impairs low-temperature activity (T<250° C.) in case of NO excess.

Accordingly, there is a need for vanadium oxide-based SCR catalysts which have both good activity for $NO_2$ excess and NO excess and low temperatures (T<250° C.). Furthermore, there is also a need to improve the thermal stability of vanadium-based SCR catalysts.

It is already known to also use niobium oxide in SCR catalysts that are based upon metal oxide. For example, U.S. Pat. No. 9,555,371 discloses an SCR catalyst containing at least 91 wt % cerium oxide and 0.1 to 9 wt % niobium oxide or tantalum oxide. WO 2012/004263 A1 also describes a catalyst containing cerium oxide and 2 to 20 wt % niobium oxide. Zirconium oxide and further metal oxides may also be present.

U.S. Pat. No. 4,378,338 describes a catalyst containing titanium, vanadium, magnesium, and another metal component, which may also be niobium. US 2012/308459 describes a catalyst containing vanadium, tungsten, and titanium, as well as another component selected from molybdenum, cobalt, and niobium.

Finally, WO 2011/032020 A2 discloses an SCR catalyst having a carrier layer and a catalytic layer. While the carrier layer contains, for example, $TiO_2$, $Al_2O_3$, $SiO_2$, $TiO_2$—$Al_2O_3$, $TiO_2$—$SiO_2$, $CeO_2$, $Al_2O_3$—$SiO_2$, or $TiO_2$—$Al_2O_3$—$SiO_2$, the catalytic layer may also contain niobium.

It has now surprisingly been found that, starting from vanadium oxide-based SCR catalysts containing cerium oxide, the above-mentioned technical problem can be solved by adding an oxide of niobium to the catalyst.

The present invention thus relates to a catalyst containing
at least one oxide of vanadium in an amount of 2 to 6 wt %,
at least one oxide of cerium in an amount of 2 to 4 wt %,
at least one oxide of niobium in an amount of 1 to 7 wt %,
and
at least one oxide of titanium in an amount measured so as to result in a total of 100 wt %,
in each case relative to the total weight of the catalyst and calculated as $V_2O_5$, $CeO_2$, $Nb_2O_5$ or $TiO_2$.

Here, the at least one oxide of titanium acts as carrier material, the at least one oxide of vanadium as active catalyst component, and the at least one of the oxides of tungsten, of cerium, and of niobium as promoters. Promoters are understood to mean substances which maintain or increase the activity of a catalyst.

In one embodiment of the catalyst according to the invention, it additionally contains at least one oxide of silicon.

In a further embodiment, the catalyst according to the invention further contains at least one oxide of tungsten in an amount of 0.001 to 2 wt %. A catalyst according to the invention containing at least one oxide of tungsten thus has the composition of
at least one oxide of vanadium in an amount of 2 to 6 wt %,
at least one oxide of tungsten in an amount of 0.001 to 2 wt %,
at least one oxide of cerium in an amount of 2 to 4 wt %,
at least one oxide of niobium in an amount of 1 to 7 wt %,
and
at least one oxide of titanium in an amount measured so as to result in a total of 100 wt %, in each case relative to the total weight of the catalyst and calculated as $V_2O_5$, $WO_3$, $CeO_2$, $Nb_2O_5$ or $TiO_2$.

In further embodiments of the catalyst according to the invention, it additionally contains at least one oxide of molybdenum, antimony, zirconium, tantalum, and/or hafnium.

In preferred embodiments of the catalyst according to the invention, it contains at least one oxide of cerium in an amount of 2 to 4 wt %, relative to the weight of the catalyst and calculated as $CeO_2$. In further preferred embodiments of the catalyst according to the invention, it contains at least one oxide of niobium in an amount of 1 to 7 wt %, relative to the weight of the catalyst and calculated as $Nb_2O_5$. In addition, preference is given to embodiments of the catalyst according to the invention containing at least one oxide of cerium in an amount of 2 to 4 wt % and calculated as $CeO_2$, and at least one oxide of niobium in amounts of 1 to 7 wt %, in each case based on the weight of the catalyst and calculated as $Nb_2O_5$.

In further preferred embodiments of the catalyst according to the invention, it contains
- at least one oxide of vanadium in an amount of 2 to 6 wt %,
- at least one oxide of tungsten in an amount of 0.5 to 2 wt %,
- at least one oxide of cerium in an amount of 2 to 4 wt %,
- at least one oxide of niobium in an amount of 1 to 7 wt %, and
- at least one oxide of titanium in an amount measured so as to result in a total of 100 wt %, in each case based on the weight of the catalyst and calculated as $V_2O_5$, $WO_3$, $CeO_2$ or $Nb_2O_5$.

If the catalyst according to the invention contains at least one oxide of silicon, it is preferably present in amounts of 2 to 7 wt %, based the weight of the catalyst and calculated as $SiO_2$.

If the catalyst according to the invention comprises at least one oxide of molybdenum, antimony, zirconium, tantalum, and/or hafnium, then the total amount of these oxides is preferably 0.5 to 20 wt %, based on the weight of the catalyst and calculated as $MoO_3$, $Sb_2O_5$, $ZrO_2$, $Ta_2O_5$ or $HfO_2$.

The catalyst according to the invention is preferably free of magnesium or compounds of magnesium.

In further embodiments, the catalyst according to the invention is also free of zirconium or compounds of zirconium.

Within the context of the present invention, the term oxide of vanadium, comprises all oxides which arise or may be present under the conditions of the preparation, storage, and use of the catalyst according to the invention. It thus comprises, for example, $V_2O_5$, but also all other oxides of vanadium.

Analogously, the term oxide of tungsten, comprises, for example, $WO_3$, but also all other oxides of tungsten, the term oxide of cerium comprises, for example, $CeO_2$, but also all other oxides of cerium, the term oxide of niobium comprises, for example, $Nb_2O_5$, but also all other oxides of niobium, the term oxide of titanium comprises, for example, $TiO_2$, but also all other oxides of titanium, and oxide of silicon comprises, for example, $SiO_2$, but also all other oxides of silicon. The same applies to the terms oxide of molybdenum, antimony, zirconium, tantalum, and hafnium.

The catalyst according to the invention can be produced in a simple manner.

Thus, for example, oxides of vanadium, tungsten, cerium, niobium, and titanium, and, optionally, of the further metal oxides, may be closely mixed in powder form in the desired amounts and then calcined. However, it is generally advantageous for the aforementioned oxides to be slurried in water and then dried and calcined.

In one variant of this method, only a portion of the metal oxides as such is initially charged, while the remaining metals are added in the form of water-soluble metal salts. For example, oxides of tungsten, cerium, niobium, and titanium can be initially charged, and then impregnated with the aqueous solution of a water-soluble vanadium compound and subsequently dried and calcined. Suitable water-soluble vanadium compounds are, in particular, vanadyloxalate, which can be obtained by dissolving vanadium pentoxide in oxalic acid (see, for example, EP 0 345 695 A2) or reaction products of vanadium pentoxide with amines or ethanolamines (see, for example, WO89/03366 A1 and WO2011/013006)—especially, ammonium metavanadate. DE 11 2007 000 814 T5 also describes the use of vanadium oxytrichloride.

Alternatively, oxides of vanadium, cerium, niobium, and titanium can also be initially charged, and then impregnated with the aqueous solution of a water-soluble tungsten compound and subsequently dried and calcined. A suitable water-soluble tungsten compound for this purpose is ammonium metatungstate.

Instead of using the individual oxides, one may also use two or more metal oxides also in the form of the corresponding mixed oxides or in the form of metal oxides doped with one or more other metal oxides. For example, a titanium dioxide doped with silicon dioxide and tungsten trioxide may be impregnated with water-soluble compounds of vanadium and niobium and then dried and calcined.

Depending in particular upon the production method, the catalyst according to the invention may be present as a mixture of metal oxides, as mixed oxide, but, in particular, in the form of intermediates between a mixture of metal oxides and mixed oxide. For example, two or three metals may be present in the form of a mixed oxide impregnated with the remaining metals.

The starting compounds required for preparing the catalyst according to the invention, such as metal oxides, mixed oxides, or water-soluble metal salts, are known to the person skilled in the art and are commercially available.

In preferred embodiments, the catalyst according to the invention is present as a coating on a carrier body, which may be present as a flow-through honeycomb body or wall flow filter.

In embodiments of the present invention, the carrier body is catalytically inert and consists of ceramic or metallic material—for example, silicon carbide, aluminum titanate, or cordierite. In these embodiments, all components of the catalyst according to the invention are present in one coating.

Coated carrier bodies can be produced according to methods familiar to the person skilled in the art, e.g., according to common dip coating methods or pump and suction coating methods with subsequent thermal post-treatment (calcination).

In another embodiment of the present invention, the catalyst according to the invention itself is a component of the carrier body, which in this case is formed from the catalyst according to the invention and a matrix component.

Carrier bodies, flow-through substrates, and wall flow substrates, which do not just consist of inert material, such as cordierite, but additionally contain a catalytically-active material, are known to the person skilled in the art. To produce them, a mixture consisting of, for example, 10 to 95 wt % of an inert matrix component and 5 to 90 wt % of catalytically-active material is extruded according to a method known per se. All of the inert materials that are also otherwise used to produce catalyst substrates can be used as matrix components in this case. These are, for example, silicates, oxides, nitrides, or carbides, wherein, in particular, magnesium aluminum silicates are preferred.

The catalyst according to the invention is particularly well suited to the reduction of nitrogen oxides in exhaust gases of lean-burn internal combustion engines—in particular, diesel engines.

The present invention, therefore, also relates to a method for the reduction of nitrogen oxides in exhaust gases of lean-burn internal combustion engines, comprising the following method steps:
  adding a reducing agent to the exhaust-gas-containing nitrogen oxides, and
  passing the resulting mixture from the exhaust-gas-containing nitrogen oxides and reducing agent over a catalyst according to the invention.

As a reducing agent, ammonia comes especially into consideration, whereby, with particular advantage, not ammonia itself, but an ammonia precursor—in particular, urea—is added to the nitrogen oxide containing exhaust gas.

In particular, the catalyst according to the invention is used as a component of an exhaust gas purification system which, for example, comprises an oxidation catalyst and a diesel particle filter arranged on the inflow side, in addition to the catalyst according to the invention. In so doing, the catalyst according to the invention can also be present as a coating on the diesel particle filter.

The present invention therefore relates also to an exhaust gas cleaning system for treating diesel exhaust gas, comprising, in the flow direction of the exhaust gas,
  an oxidation catalyst,
  a diesel particle filter, and
  a catalyst according to the invention,
or
  an oxidation catalyst, and
  a diesel particle filter on which a catalyst according to the invention is present as a coating.

Oxidation catalysts suitable for the exhaust gas cleaning system according to the invention—in particular, platinum, palladium, or platinum and palladium carried on, for example, aluminum oxide—and diesel particle filters are known to the person skilled in the art and are commercially available.

The exhaust gas purification system of the present invention generally comprises a device for metering in the reducing agent that is arranged upstream of the catalyst according to the invention.

The injection device can be chosen at will by the person skilled in the art, wherein suitable devices can be taken from the literature (see, for example, T. Mayer, Feststoff-SCR-System auf Basis von Ammonium-carbamat, Dissertation, T U Kaiserslautern, 2005). The reducing agent introduced into the exhaust gas stream via the injection device may be, in particular, ammonia as such or in the form of a compound from which ammonia is formed under the ambient conditions. Examples of suitable compounds are aqueous solutions of urea or ammonium formate, as well as solid ammonium carbamate. As a rule, the reducing agent or a precursor thereof is kept in stock in a container that is carried along with and connected to the injection device.

The invention is explained below in more detail by means of figures and examples. The following are shown.

EXAMPLE 1 a) A commercially available titanium dioxide in the anatase form doped with 5 wt % silicon dioxide was dispersed in water, and then vanadium dioxide ($VO_2$), tungsten trioxide ($WO_3$), cerium dioxide ($CeO_2$), and ammonium niobium oxalate were added in amounts so as to result in a catalyst of the composition 85.98 wt % $TiO_2$, 4.53 wt % $SiO_2$, 3.75 wt % $V_2O_5$, 1.00 wt % $WO_3$, 2.00 wt % $CeO_2$, and 2.75 wt % $Nb_2O_5$. The mixture was vigorously stirred and then milled in a commercially available agitator bead mill.

b) The dispersion obtained according to a) was coated in a conventional manner onto a commercially available ceramic flow substrate with a volume of 0.5 L and a cell number of 62 cells per square centimeter at a wall thickness of 0.17 mm over its entire length, with a washcoat loading of 360 g/L. The powder thus obtained was dried at 90° C. and then calcined at 600° C. for 2 hours. The catalyst K1 thus obtained is present in the fresh state and is therefore referred to hereinafter as K1f.

c) The catalyst K1 obtained according to b) was subjected to hydrothermal aging for 48 hours in a gas atmosphere (10% $O_2$, 10% $H_2O$, remainder $N_2$) at 700° C. Catalyst K1 is then present in the aged state and is referred to hereinafter as K1a.

EXAMPLE 2 a) A commercially available titanium dioxide in the anatase form stabilized with 5 wt % silicon dioxide was dispersed in water, and then vanadium dioxide (VO$_2$), cerium dioxide (CeO$_2$), and ammonium niobium oxalate were added in amounts so as to result in a catalyst of the composition 86.93 wt % TiO$_2$, 4.58 wt % SiO$_2$, 3.75 wt % V$_2$O$_5$, 2.00 wt % CeO$_2$, and 2.75 wt % Nb$_2$O$_5.$ The mixture was vigorously stirred and then milled in a commercially available agitator bead mill.

b) The dispersion obtained according to a) was coated in a customary manner onto a commercially available ceramic flow substrate with a volume of 0.5 L and a cell number of 62 cells per square centimeter at a wall thickness of 0.17 mm over its entire length, with a washcoat loading of 360 g/L. It was then dried at 90° C. and calcined at 600° C. for 2 hours. Catalyst K2 thus obtained is present in the fresh state and is therefore referred to hereinafter as K2f.

c) Catalyst K2 obtained according to b) was subjected to hydrothermal aging in a gas atmosphere (10% O$_2$, 10% H$_2$O, remainder N$_2$) at 700° C. for 48 hours. Catalyst K2 is then present in the aged state and is referred to hereinafter as K2a.

COMPARATIVE EXAMPLE 1 a) A commercially available titanium dioxide in the anatase form stabilized with 5 wt % silicon dioxide was dispersed in water, and then vanadium dioxide (VO$_2$) and tungsten trioxide (WO$_3$) were added in amounts so as to result in a catalyst of the composition 90.49 wt % TiO$_2$, 4.76 wt % SiO$_2$, 3.75 wt % V$_2$O$_5$, 1.00 wt % WO$_3$. The mixture was vigorously stirred and then milled in a commercially available agitator bead mill.

b) The dispersion obtained according to a) was coated in a customary manner onto a commercially available ceramic flow substrate with a volume of 0.5 L and a cell number of 62 cells per square centimeter at a wall thickness of 0.17 mm over its entire length, with a washcoat loading of 360 g/L. It was then dried at 90° C. and calcined at 600° C. for 2 hours. Catalyst VK1 thus obtained is present in the fresh state and is therefore referred to hereinafter as VK1f.

c) Catalyst VK1 obtained according to b) was subjected to hydrothermal aging in a gas atmosphere (10% O$_2$, 10% H$_2$O, remainder N$_2$) at 700° C. for 48 hours. Catalyst VK1 is then present in the aged state and is referred to hereinafter as VK1a.

COMPARATIVE EXAMPLE 2 a) A commercially available titanium dioxide in the anatase form stabilized with 5 wt % silicon dioxide was dispersed in water, and then vanadium dioxide (VO$_2$), tungsten trioxide (WO$_3$), and cerium dioxide (CeO$_2$) were added in amounts so as to result in a catalyst of the composition 88.59 wt % TiO$_2$, 4.66 wt % SiO$_2$, 3.75 wt % V$_2$O$_5$, 1.00 wt % WO$_3$, and 2.00 wt % CeO$_2$. The mixture was vigorously stirred and then milled in a commercially available agitator bead mill.

b) The dispersion obtained according to a) was coated in a customary manner onto a commercially available ceramic flow substrate with a volume of 0.5 L and a cell number of 62 cells per square centimeter at a wall thickness of 0.17 mm over its entire length, with a washcoat loading of 360 g/L. It was then dried at 90° C. and calcined at 600° C. for 2 hours. Catalyst VK2 thus obtained is present in the fresh state and is therefore referred to hereinafter as VK2f.

c) Catalyst VK2 obtained according to b) was subjected to hydrothermal aging in a gas atmosphere (10% O$_2$, 10% H$_2$O, remainder N$_2$) at 700° C. for 48 hours. Catalyst VK2 is then present in the aged state and is referred to hereinafter as VK2a.

COMPARATIVE EXAMPLE 3 a) A commercially available titanium dioxide in the anatase form stabilized with 5 wt % silicon dioxide was dispersed in water, and then vanadium dioxide (VO$_2$), tungsten trioxide (WO$_3$), and ammonium niobium oxalate were added in amounts such as to result in a catalyst of the composition 87.88 wt % TiO$_2$, 4.63 wt % SiO$_2$, 3.75 wt % V$_2$O$_5$, 1.00 wt % WO$_3$, and 2.75 wt % Nb$_2$O$_5.$ The mixture was vigorously stirred and then milled in a commercially available agitator bead mill.

b) The dispersion obtained according to a) was coated in a customary manner onto a commercially available ceramic flow substrate with a volume of 0.5 L and a cell number of 62 cells per square centimeter at a wall thickness of 0.17 mm over its entire length, with a washcoat loading of 360 g/L. It was then dried at 90° C. and calcined at 600° C. for 2 hours. Catalyst VK3 thus obtained is present in the fresh state and is therefore referred to hereinafter as VK3f.

c) Catalyst VK3 obtained according to b) was subjected to hydrothermal aging in a gas atmosphere (10% O$_2$, 10% H$_2$O, remainder N$_2$) at 700° C. for 48 hours. Catalyst VK3 is then present in the aged state and is referred to hereinafter as VK3a.

COMPARATIVE EXAMPLE 4 a) A commercially available titanium dioxide in the anatase form was dispersed in water, and then vanadium dioxide (VO$_2$), tungsten trioxide (WO$_3$), cerium dioxide (CeO$_2$), and ammonium niobium oxalate were added in amounts so as to result in a catalyst of the composition 90.50 wt % TiO$_2$, 3.75 wt % V$_2$O$_5$, 1.00 wt % WO$_3$, 2.00 wt % CeO$_2,$ and 2.75 wt % Nb$_2$O$_5$. The mixture was vigorously stirred and then milled in a commercially available agitator bead mill.

b) The dispersion obtained according to a) was coated in a customary manner onto a commercially available ceramic flow substrate with a volume of 0.5 L and a cell number of 62 cells per square centimeter at a wall thickness of 0.17 mm over its entire length, with a washcoat loading of 360 g/L. It was then dried at 90° C. and calcined at 600° C. for 2 hours. Catalyst VK4 thus obtained is present in the fresh state and is therefore referred to hereinafter as VK4f.

c) Catalyst VK4 obtained according to b) was subjected to hydrothermal aging in a gas atmosphere (10% O$_2$, 10% H$_2$O, remainder N$_2$) at 700° C. for 48 hours. Catalyst VK4 is then present in the aged state and is referred to hereinafter as VK4a.

COMPARATIVE EXAMPLE 5 a) A commercially available titanium dioxide in the anatase form stabilized with 5 wt % silicon dioxide was dispersed in water, and then vanadium dioxide (VO$_2$), tungsten trioxide (WO$_3$), cerium dioxide (CeO$_2$), and ammonium niobium oxalate were added in amounts so as to result in a catalyst of the composition 86.45 wt % TiO$_2$, 4.55 wt % SiO$_2$, 3.75 wt % V$_2$O$_5$, 0.50 wt %

$WO_3$, 2.00 wt % $CeO_2$, and 2.75 wt % $Nb_2O_5$. The mixture was vigorously stirred and then milled in a commercially available agitator bead mill.

b) The dispersion obtained according to a) was coated in a customary manner onto a commercially available ceramic flow substrate with a volume of 0.5 L and a cell number of 62 cells per square centimeter at a wall thickness of 0.17 mm over its entire length, with a washcoat loading of 360 g/L. It was then dried at 90° C. and calcined at 600° C. for 2 hours. Catalyst VK5 thus obtained is present in the fresh state and is therefore referred to hereinafter as VK5f.

c) Catalyst VK5 obtained according to b) was subjected to hydrothermal aging in a gas atmosphere (10% $O_2$, 10% $H_2O$, remainder $N_2$) at 700° C. for 48 hours. Catalyst VK5 is then present in the aged state and is referred to hereinafter as VK5a.

COMPARATIVE EXAMPLE 6 a) A commercially available titanium dioxide in the anatase form stabilized with 5 wt % silicon dioxide was dispersed in water, and then vanadium dioxide ($VO_2$), tungsten trioxide ($WO_3$), cerium dioxide ($CeO_2$), and ammonium niobium oxalate were added in amounts so as to result in a catalyst of the composition 85.03 wt % $TiO_2$, 4.48 wt % $SiO_2$, 3.75 wt % $V_2O_5$, 2.00 wt % $WO_3$, 2.00 wt % $CeO_2$, and 2.75 wt % $Nb_2O_5$. The mixture was vigorously stirred and then milled in a commercially available agitator bead mill.

b) The dispersion obtained according to a) was coated in a customary manner onto a commercially available ceramic flow substrate with a volume of 0.5 L and a cell number of 62 cells per square centimeter at a wall thickness of 0.17 mm over its entire length, with a washcoat loading of 360 g/L. It was then dried at 90° C. and calcined at 600° C. for 2 hours. Catalyst VK6 thus obtained is present in the fresh state and is therefore referred to hereinafter as VK6f.

c) Catalyst VK6 obtained according to b) was subjected to hydrothermal aging in a gas atmosphere (10% $O_2$, 10% $H_2O$, remainder $N_2$) at 700° C. for 48 hours. Catalyst VK6 is then present in the aged state and is referred to hereinafter as VK6a.

COMPARATIVE EXAMPLE 7 a) A commercially available titanium dioxide in the anatase form stabilized with 5 wt % silicon dioxide was dispersed in water, and then vanadium dioxide ($VO_2$), tungsten trioxide ($WO_3$), cerium dioxide ($CeO_2$), and ammonium niobium oxalate were added in amounts so as to result in a catalyst of the composition 84.08 wt % $TiO_2$, 4.43 wt % $SiO_2$, 3.75 wt % $V_2O_5$, 1.00 wt % $WO_3$, 4.00 wt % $CeO_2$, and 2.75 wt % $Nb_2O_5$. The mixture was vigorously stirred and then milled in a commercially available agitator bead mill.

b) The dispersion obtained according to a) was coated in a customary manner onto a commercially available ceramic flow substrate with a volume of 0.5 L and a cell number of 62 cells per square centimeter at a wall thickness of 0.17 mm over its entire length, with a washcoat loading of 360 g/L. It was then dried at 90° C. and calcined at 600° C. for 2 hours. Catalyst VK7 thus obtained is present in the fresh state and is therefore referred to hereinafter as VK7f.

c) Catalyst VK7 obtained according to b) was subjected to hydrothermal aging in a gas atmosphere (10% $O_2$, 10% $H_2O$, remainder $N_2$) at 700° C. for 48 hours. Catalyst VK7 is then present in the aged state and is referred to hereinafter as VK7a.

COMPARATIVE EXAMPLE 8 a) A commercially available titanium dioxide in the anatase form stabilized with 5 wt % silicon dioxide was dispersed in water, and then vanadium dioxide ($VO_2$), tungsten trioxide ($WO_3$), cerium dioxide ($CeO_2$), and ammonium niobium oxalate were added in amounts so as to result in a catalyst of the composition 84.79 wt % $TiO_2$, 4.46 wt % $SiO_2$, 3.75 wt % $V_2O_5$, 1.00 wt % $WO_3$, 2.00 wt % $CeO_2$, and 4.00 wt % $Nb_2O_5$. The mixture was vigorously stirred and then milled in a commercially available agitator bead mill.

b) The dispersion obtained according to a) was coated in a customary manner onto a commercially available ceramic flow substrate with a volume of 0.5 L and a cell number of 62 cells per square centimeter at a wall thickness of 0.17 mm over its entire length, with a washcoat loading of 360 g/L. It was then dried at 90° C. and calcined at 600° C. for 2 hours. Catalyst VK8 thus obtained is present in the fresh state and is therefore referred to hereinafter as VK8f.

c) Catalyst VK8 obtained according to b) was subjected to hydrothermal aging in a gas atmosphere (10% $O_2$, 10% $H_2O$, remainder $N_2$) at 700° C. for 48 hours. Catalyst VK8 is then present in the aged state and is referred to hereinafter as VK8a.

COMPARATIVE EXAMPLE 9 a) A commercially available titanium dioxide in the anatase form stabilized with 5 wt % silicon dioxide was dispersed in water, and then vanadium dioxide ($VO_2$), tungsten trioxide ($WO_3$), cerium dioxide ($CeO_2$), and ammonium niobium oxalate were added in amounts so as to result in a catalyst of the composition 81.94 wt % $TiO_2$, 4.31 wt % $SiO_2$, 3.75 wt % $V_2O_5$, 1.00 wt % $WO_3$, 2.00 wt % $CeO_2$, and 7.00 wt % $Nb_2O_5$. The mixture was vigorously stirred and then milled in a commercially available agitator bead mill.

b) The dispersion obtained according to a) was coated in a customary manner onto a commercially available ceramic flow substrate with a volume of 0.5 L and a cell number of 62 cells per square centimeter at a wall thickness of 0.17 mm over its entire length, with a washcoat loading of 360 g/L. It was then dried at 90° C. and calcined at 600° C. for 2 hours. Catalyst VK9 thus obtained is present in the fresh state and is therefore referred to hereinafter as VK9f.

c) Catalyst VK9 obtained according to b) was subjected to hydrothermal aging in a gas atmosphere (10% $O_2$, 10% $H_2O$, remainder $N_2$) at 700° C. for 48 hours. Catalyst VK9 is then present in the aged state and is referred to hereinafter as VK9a.

Table 1 summarizes the compositions of the catalysts of the examples mentioned. The composition of the catalyst according to the invention is not limited to explicitly shown examples.

TABLE 1

Compositions of the Catalysts of the Examples

| | Composition | | | | | |
|---|---|---|---|---|---|---|
| Example | $V_2O_5$ (wt %) | $WO_3$ (wt %) | $CeCO_2$ (wt %) | $Nb_2O_5$ (wt %) | $SiO_2$ (wt %) | $TiO_2$ (wt %) |
| K1 | 3.75 | 1.00 | 2.00 | 2.75 | 4.53 | 85.98 |
| K2 | 3.75 | | 2.00 | 2.75 | 4.58 | 86.93 |
| VK1 | 3.75 | 1.00 | | | 4.76 | 90.49 |
| VK2 | 3.75 | 1.00 | 2.00 | | 4.66 | 88.59 |
| VK3 | 3.75 | 1.00 | | 2.75 | 4.63 | 87.88 |
| VK4 | 3.75 | 1.00 | 2.00 | 2.75 | | 90.50 |
| VK5 | 3.75 | 0.50 | 2.00 | 2.75 | 4.55 | 86.45 |
| VK6 | 3.75 | 2.00 | 2.00 | 2.75 | 4.48 | 85.03 |
| VK7 | 3.75 | 1.00 | 4.00 | 2.75 | 4.43 | 84.07 |
| VK8 | 3.75 | 1.00 | 2.00 | 4.00 | 4.46 | 84.79 |
| VK9 | 3.75 | 1.00 | 2.00 | 7.00 | 4.31 | 81.94 |

Nitrogen Oxide Conversion Assay as a Measure of SCR Activity:

The NO conversions of the catalysts and comparative catalysts prepared according to the examples and comparative examples described above were determined in a quartz glass reactor. Drill cores with L=3" and D=1" were tested between 200 and 400° C. under steady-state conditions. Testing was carried out in a laboratory model gas system under the following conditions.

| Composition of the model gas | | |
|---|---|---|
| | Standard SCR reaction | Fast SCR reaction |
| $NO_x$ [vol. ppm]: | 1,000 | 1,000 |
| $NO_2/NO_x$ [%] | 0 | 75 |
| $NH_3$ [vol. ppm]: | 1,100 | 1,350 |

| Composition of the model gas | | |
|---|---|---|
| | Standard SCR reaction | Fast SCR reaction |
| $O_2$ [vol %]: | 10 | 10 |
| $H_2O$ [vol %] | 5 | 5 |
| $N_2$: | Remainder | Remainder |
| General test conditions | | |
| Space velocity [$h^{-1}$]: | 60.000 | |
| Temperature [° C.] | 200; 250; 300; 350; 400 | |
| Conditioning before start of measurement: | Model gas atmosphere; 550° C.; several minutes | |

During measurement, the nitrogen oxide concentrations of the model gas after flowing through the catalyst were recorded using a suitable analysis method. From the known, dosed nitrogen oxide contents that were verified during conditioning at the beginning of the respective test flow with a pre-catalyst exhaust gas analysis, and the nitrogen oxide conversion contents measured after flowing through the catalyst, the nitrogen oxide conversion, relative to the ratio of $NH_3$ to NO, over the catalyst was calculated for each temperature measuring point as follows:

$$U_{NO_x}[\%] = \left(1 - \frac{C_{output}(NO_x)}{C_{input}(NO_x)}\right) \times 100$$

with $$C_{input/output}(NO_x) = C_{input/output}(NO) + C_{input/output}(NO_2) + C_{input/output}(N_2O)$$

The resulting nitrogen oxide conversion values $U_{NO_x}$ [%] were plotted as a function of the temperature measured before to the catalyst, in order to evaluate the SCR activity of the investigated materials.

Table 2 shows the NOx conversion in the standard SCR reaction for the examples described above.

TABLE 2

NOx Conversion in the Standard SCR Reaction

Nitrogen oxide conversion (%) in standard SCR reaction

| | fresh | | | | | after hydrothermal aging at 700° C. for 48 h | | | | |
|---|---|---|---|---|---|---|---|---|---|---|
| | 400° C. | 350° C. | 300° C. | 250° C. | 200° C. | 400° C. | 350° C. | 300° C. | 250° C. | 200° C. |
| K1 | 98.54 | 98.78 | 97.82 | 91.93 | 63.64 | 22.57 | 29.70 | 25.94 | 14.31 | 5.09 |
| K2 | 98.78 | 99.07 | 98.59 | 94.36 | 64.88 | 78.75 | 83.91 | 76.95 | 51.79 | 20.65 |
| VK1 | 97.88 | 97.98 | 96.05 | 84.57 | 43.45 | −3.39 | 3.43 | 3.20 | 2.00 | 0.91 |
| VK2 | 98.34 | 98.28 | 96.47 | 85.23 | 42.56 | 6.33 | 7.43 | 7.15 | 4.89 | 2.03 |
| VK3 | 98.90 | 99.25 | 98.55 | 93.35 | 62.44 | 9.62 | 18.23 | 15.89 | 9.17 | 3.14 |
| VK4 | 98.95 | 99.39 | 98.97 | 95.29 | 70.15 | 5.07 | 6.35 | 6.30 | 4.19 | 1.60 |
| VK5 | 99.06 | 99.37 | 98.87 | 94.82 | 66.63 | 26.39 | 34.77 | 30.01 | 16.70 | 6.03 |
| VK6 | 99.46 | 99.69 | 99.40 | 96.20 | 68.88 | 12.37 | 18.49 | 16.43 | 9.47 | 3.22 |
| VK7 | 98.81 | 99.21 | 98.54 | 93.89 | 67.28 | 93.78 | 95.09 | 97.77 | 72.47 | 31.61 |
| VK8 | 98.99 | 99.35 | 98.76 | 93.80 | 65.65 | 24.57 | 30.70 | 27.26 | 15.09 | 5.39 |
| VK9 | 98.94 | 99.40 | 98.95 | 94.38 | 67.22 | 36.05 | 41.96 | 37.18 | 20.49 | 7.30 |

Figure 1:
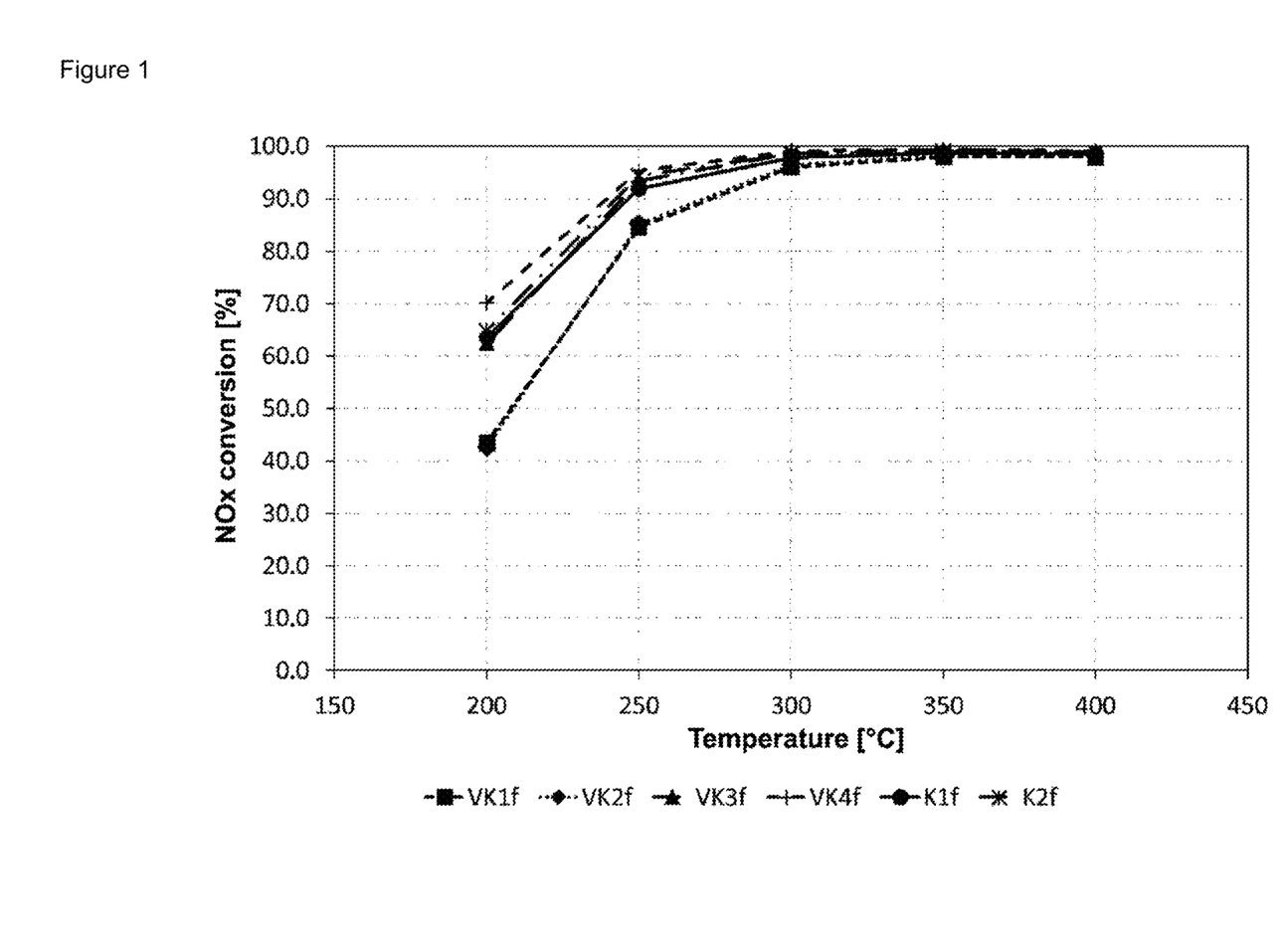
FIG. 1: Nitrogen oxide conversions in the standard SCR reaction, measured at catalysts K1 and K2 according to the present invention in comparison to the comparative catalysts VK1, VK2, VK3, and VK4 in the fresh state (K1f, K2f, VK1f, VK2f, VK3f, VK4f).

The results of the standard SCR reaction of the fresh catalysts are shown in FIG. 1.

Figure 2:
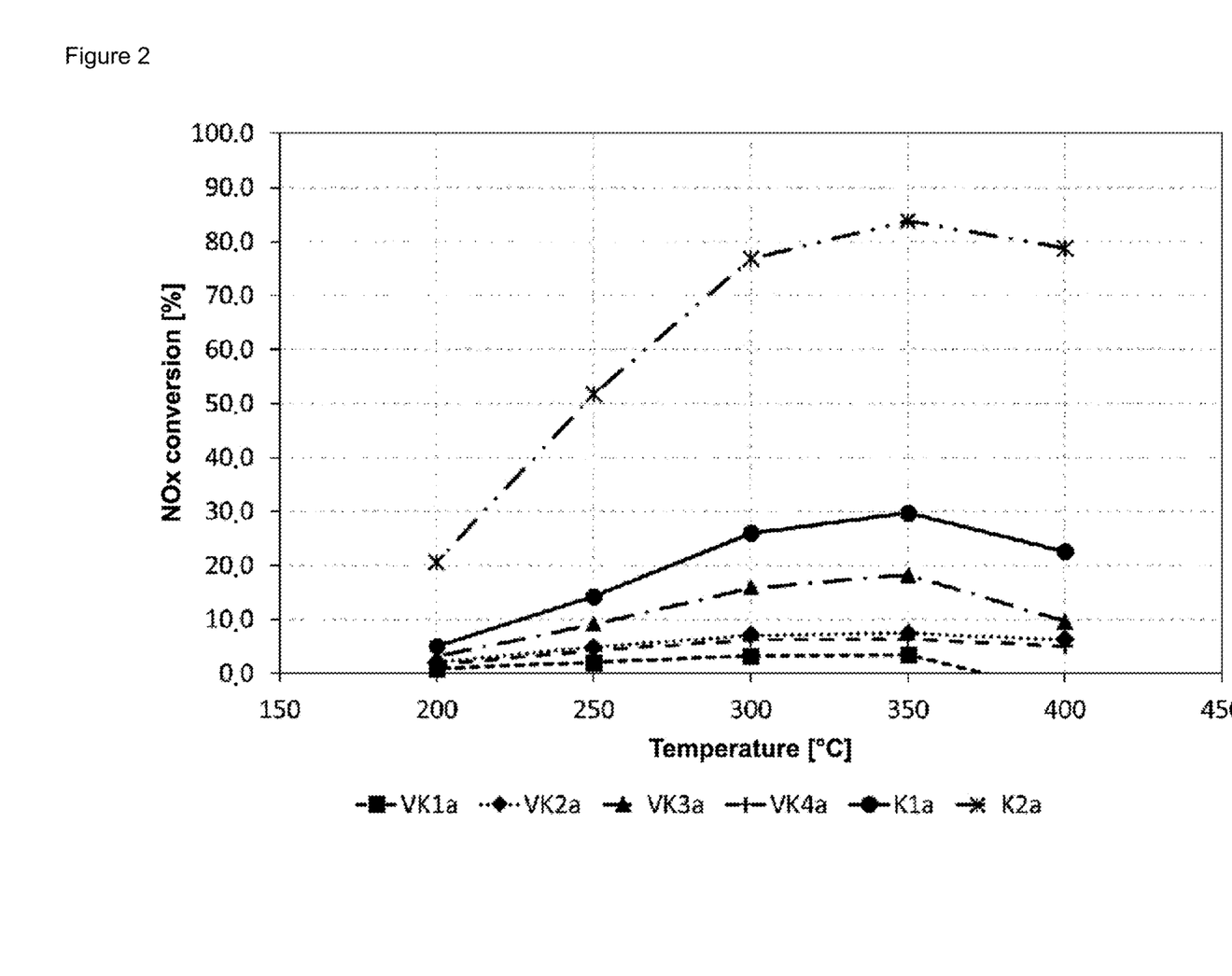
FIG. 2: Nitrogen oxide conversions in the standard SCR reaction, measured at catalysts K1 and K2 according to the present invention in comparison to the comparative catalysts VK1, VK2, VK3, and VK4 in the aged state (K1a, K2a, VK1a, VK2a, VK3a, VK4a).

The results of the standard SCR reaction of the aged catalysts are shown in FIG. 2.

Table 3 shows the NOx conversion in the fast SCR reaction for the examples described above.

TABLE 3

NOx Conversion in the Fast SCR Reaction

Nitrogen oxide conversion (%) in fast SCR reaction

| | fresh | | | | | after hydrothermal aging at 700° C. for 48 h | | | | |
|---|---|---|---|---|---|---|---|---|---|---|
| | 400° C. | 350° C. | 300° C. | 250° C. | 200° C. | 400° C. | 350° C. | 300° C. | 250° C. | 200° C. |
| K1 | 98.61 | 90.75 | 70.50 | 61.59 | 60.92 | 62.69 | 54.34 | 49.10 | 43.04 | 31.35 |
| K2 | 98.32 | 89.15 | 68.88 | 61.01 | 59.82 | 93.29 | 74.46 | 57.47 | 52.83 | 50.97 |
| VK1 | 97.55 | 79.12 | 60.80 | 57.07 | 50.40 | 15.90 | 21.91 | 21.69 | 18.71 | 11.21 |
| VK2 | 98.38 | 91.22 | 69.91 | 59.35 | 52.61 | 34.02 | 37.31 | 38.09 | 32.95 | 18.65 |
| VK3 | 99.07 | 85.50 | 64.57 | 61.54 | 62.93 | 51.59 | 48.35 | 45.83 | 38.11 | 24.33 |
| VK4 | 99.60 | 96.66 | 76.89 | 62.23 | 62.86 | 30.62 | 35.51 | 37.83 | 33.77 | 22.23 |
| VK5 | 99.30 | 92.60 | 71.73 | 62.86 | 63.11 | 69.13 | 57.50 | 51.84 | 47.09 | 35.50 |
| VK6 | 99.76 | 95.59 | 72.97 | 62.51 | 64.86 | 51.03 | 49.07 | 46.70 | 39.70 | 25.94 |
| VK7 | 98.26 | 92.87 | 74.15 | 62.79 | 62.71 | 97.25 | 88.89 | 69.05 | 57.82 | 56.82 |
| VK8 | 98.72 | 93.08 | 72.22 | 61.93 | 63.67 | 63.89 | 55.38 | 51.21 | 45.98 | 33.41 |
| VK9 | 98.95 | 96.32 | 79.12 | 63.80 | 64.53 | 70.04 | 57.62 | 52.22 | 48.88 | 38.15 |

Figure 3:
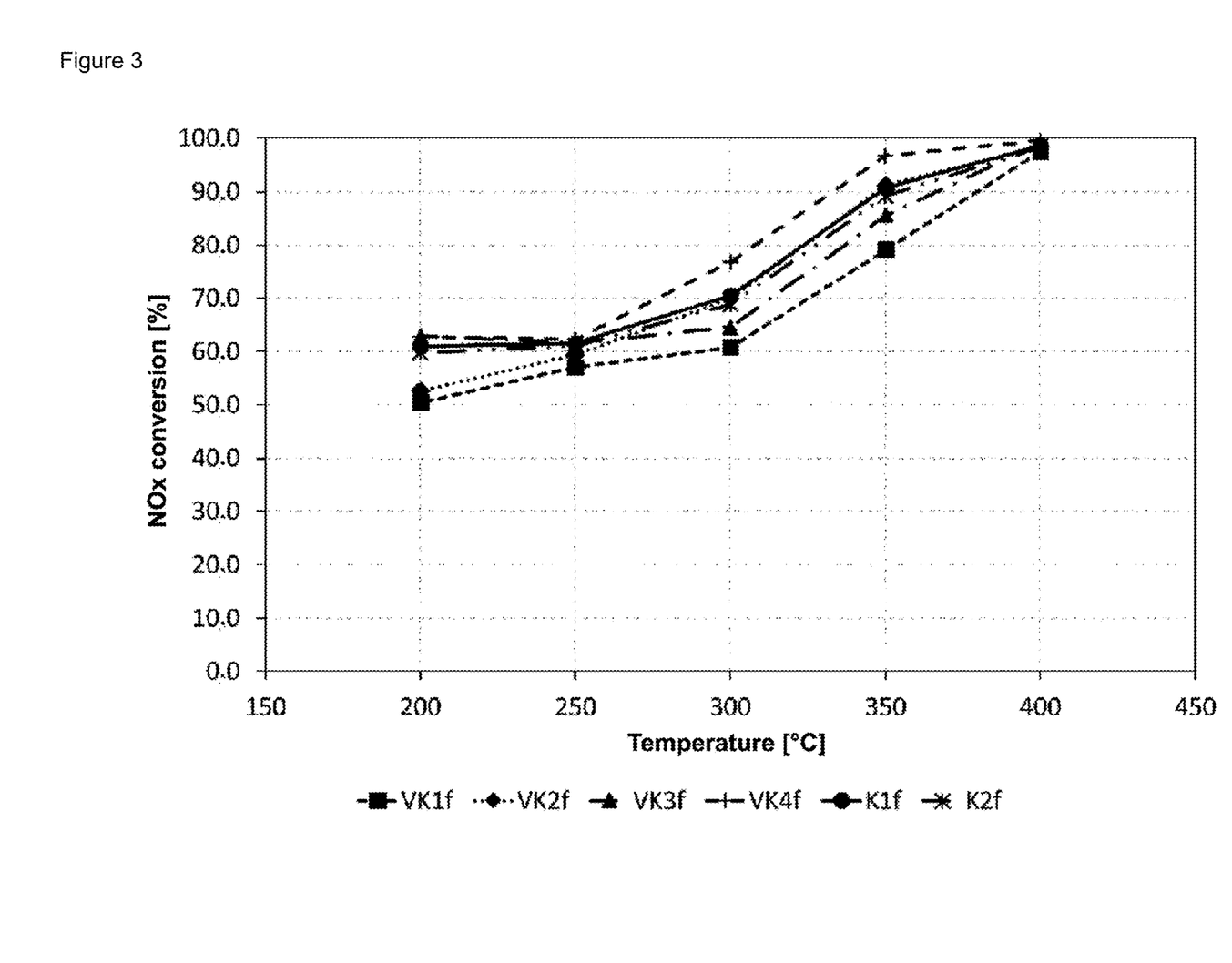
FIG. 3: Nitrogen oxide conversions in the fast SCR reaction, measured at catalysts K1 and K2 according to the present invention in comparison to the comparative catalysts VK1, VK2, VK3, and VK4 in the fresh state (K1f, K2f, VK1f, VK2f, VK3f, and VK4f).

The results of the fast SCR reaction of the fresh catalysts are shown in FIG. 3.

Figure 4:
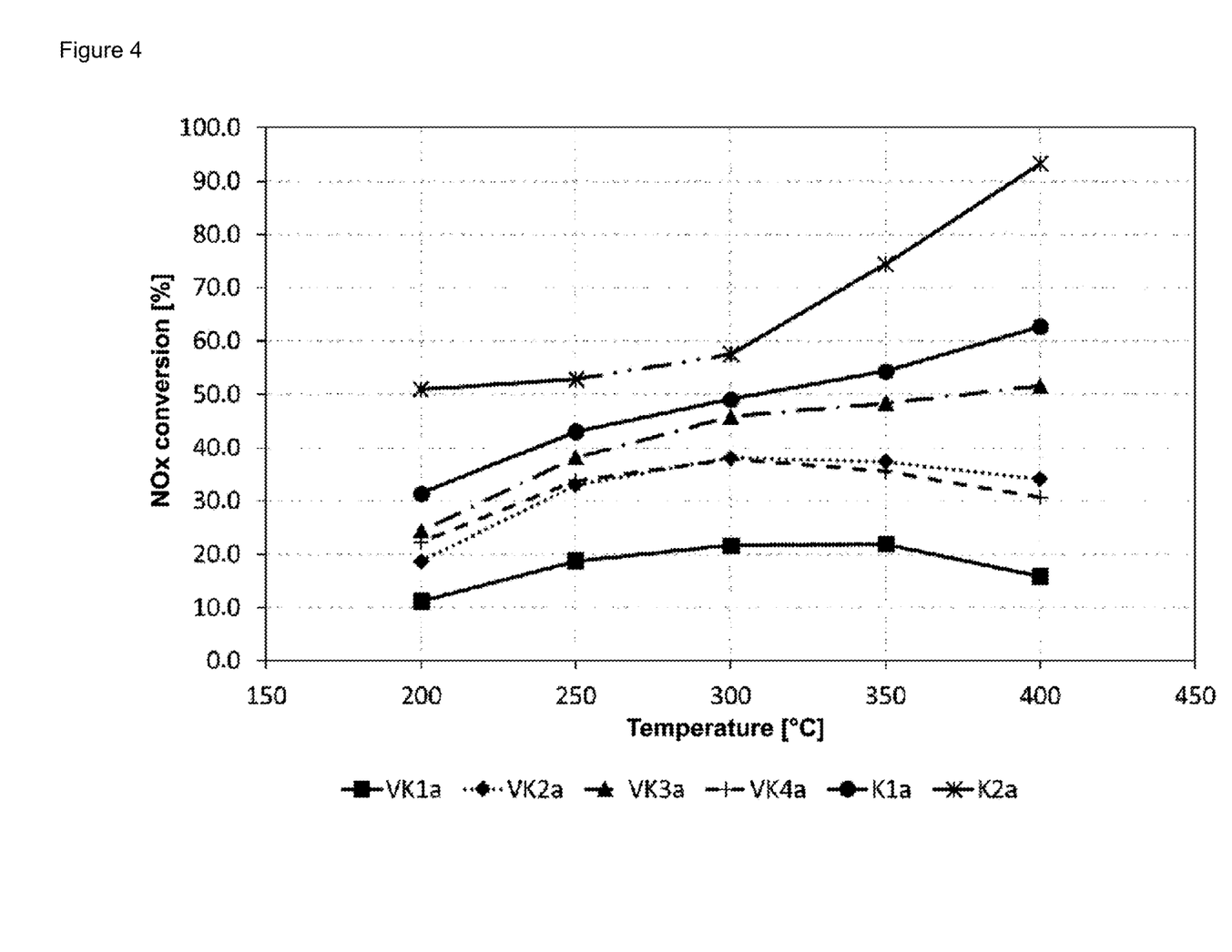
FIG. 4: Nitrogen oxide conversions in the fast SCR reaction, measured at catalyst K1 and K2 according to the present invention in comparison to the comparative catalysts VK1, VK2, VK3, and VK4 in the aged state (K1a, K2a, VK1a, VK2a, VK3a, VK4a).

The results of the fast SCR reaction of the aged catalysts are shown in FIG. 4.

Figure 5:
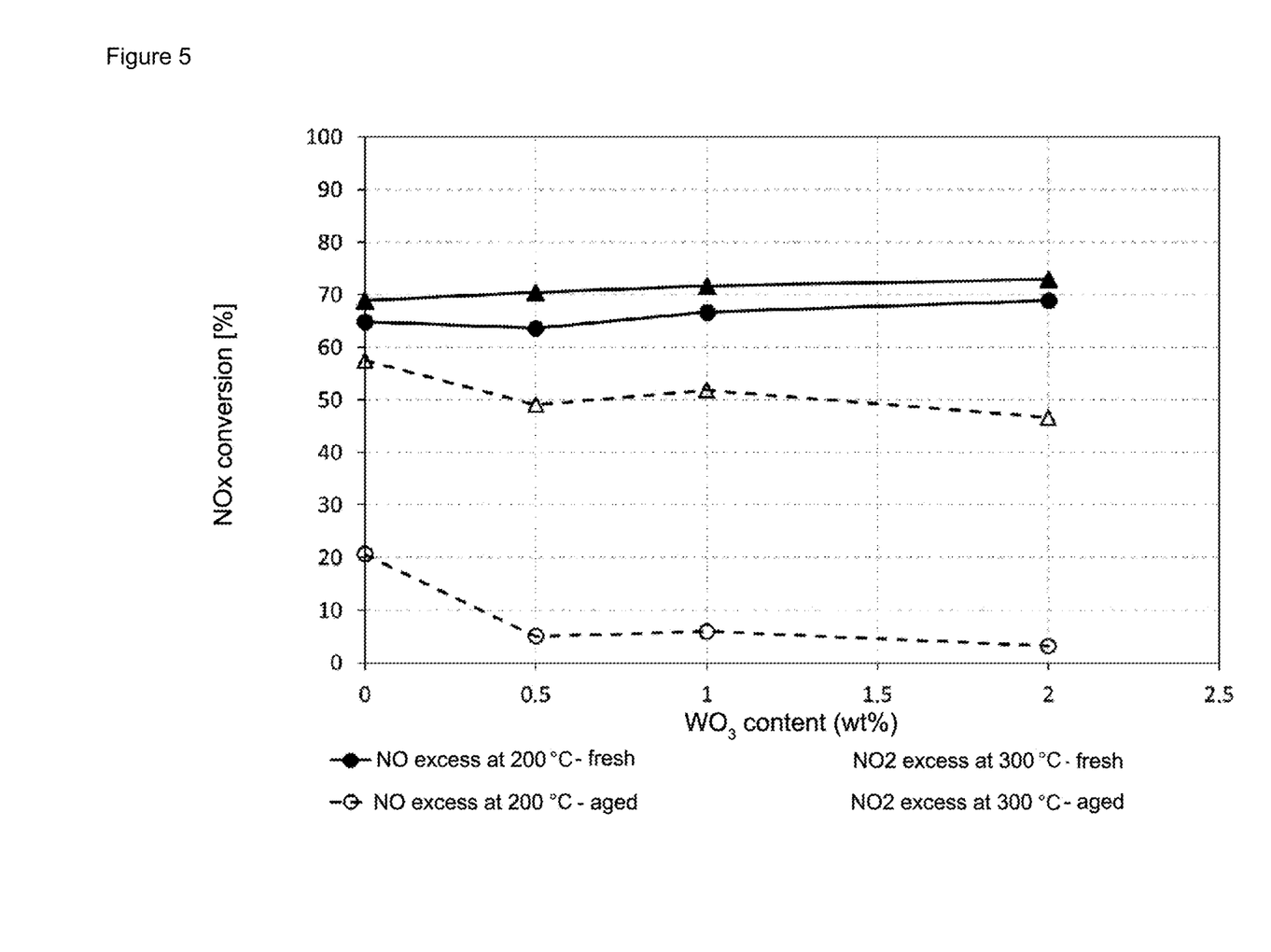
FIG. 5: Nitrogen oxide conversions in the standard SCR reaction at 200° C. and fast SCR reaction at 300° C. versus the $WO_3$ content, measured at catalysts K1 and K2 according to the present invention in comparison to the comparative catalysts VK5 and VK6 in the fresh and aged states.

The influence of the $WO_3$ content of the catalyst on the NOx conversion in the standard SCR reaction at 200° C. and in the fast SCR reaction at 300° C. in the fresh and aged states is shown in Table 4. The amounts of $V_2O_5$, $CeO_2$, and $Nb_2O_5$ were kept constant at 3.75 wt %, 2.00 wt %, and 2.75 wt %, respectively, while the $WO_3$ content was varied from 0.00 wt % (K2) to 0.50 wt % (VK5), 1.00 wt % (K1), and 2.00 wt % (VK6).

TABLE 4

Influence of $WO_3$ Content on the NOx Conversion
Influence of $WO_3$ content on NOx conversion

| $WO_3$ content | In the standard SCR reaction at 200° C. | | In the fast SCR reaction at 300° C. | |
|---|---|---|---|---|
| [wt %] | fresh | aged | fresh | aged |
| 0 | 64.9 | 20.7 | 68.9 | 57.5 |
| 0.5 | 63.6 | 5.1 | 70.5 | 49.1 |
| 1 | 66.6 | 6.0 | 71.73 | 51.8 |
| 2 | 68.9 | 3.2 | 73.0 | 46.7 |

The results of the influence of the $WO_3$ content are shown in FIG. 5.

Figure 6:
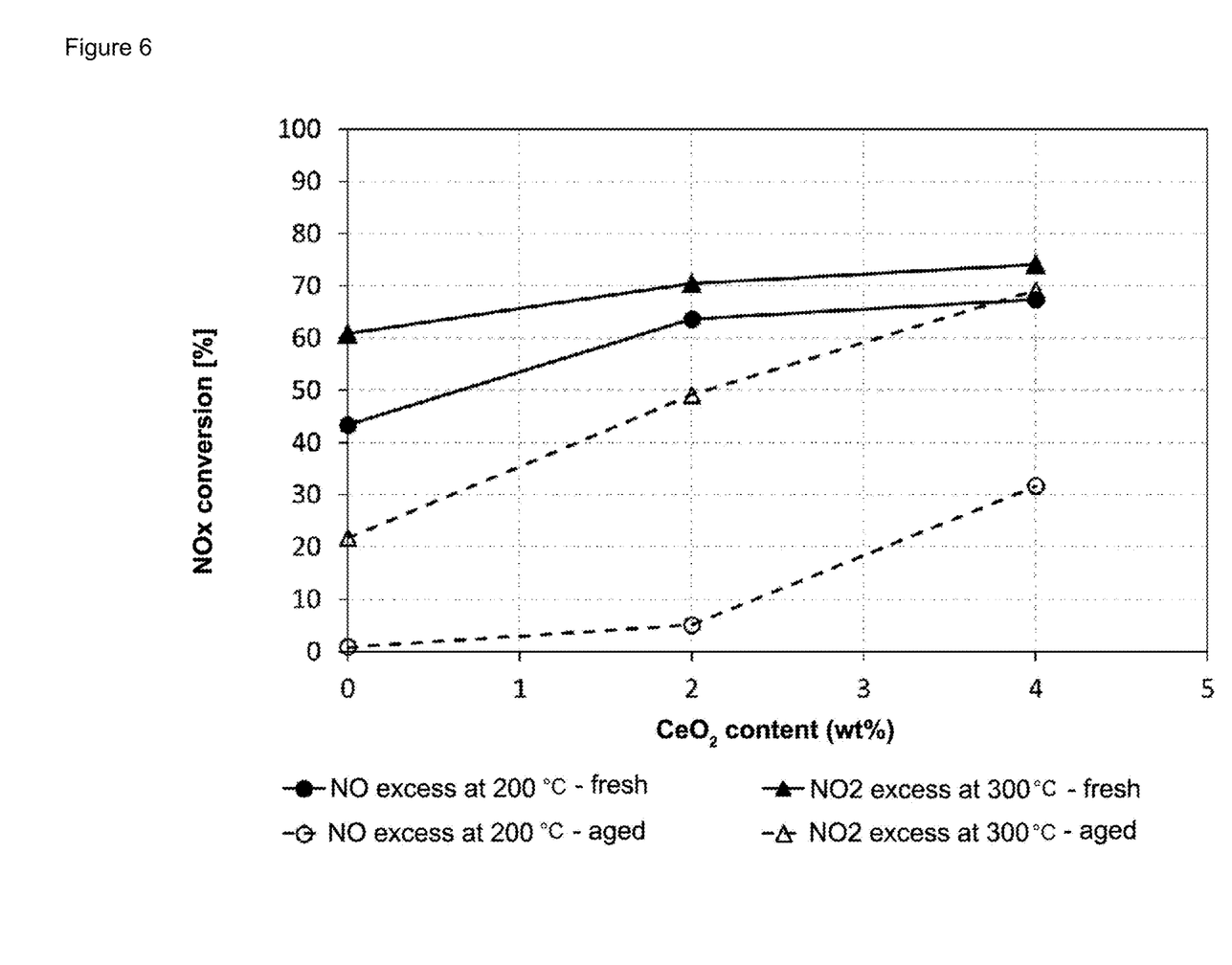
FIG. 6: Nitrogen oxide conversions in the standard SCR reaction at 200° C. and fast SCR reaction at 300° C. versus the $CeO_2$ content, measured at catalyst K1 according to the present invention in comparison to the comparative catalysts VK3 and VK7 in the fresh and aged states.

The influence of the $CeO_2$ content of the catalyst on the NOx conversion in the standard SCR reaction at 200° C. and in the fast SCR reaction at 300° C. in the fresh and aged states is shown in Table 5. The amounts of $V_2O_5$, $WO_3$, and $Nb_2O_5$ were held constant at 3.75 wt %, 1.00 wt %, and 2.75 wt %, respectively, while the $CeO_2$ content was varied from 0.00 wt % (VK3) to 2.00 wt % (K1) and 2.00 wt % (VK7).

TABLE 5

Influence of $CeO_2$ Content on NOx Conversion
Influence of $CeO_2$ content on NOx conversion

| $CeO_2$ content | In the standard SCR reaction at 200° C. | | In the fast SCR reaction at 300° C. | |
|---|---|---|---|---|
| [wt %] | fresh | aged | fresh | aged |
| 0 | 43.4 | 0.9 | 60.8 | 21.7 |
| 2 | 63.6 | 5.1 | 70.5 | 49.1 |
| 4 | 67.3 | 31.6 | 74.2 | 69.1 |

The results of the influence of the $CeO_2$ content are shown in FIG. 6.

Figure 7:
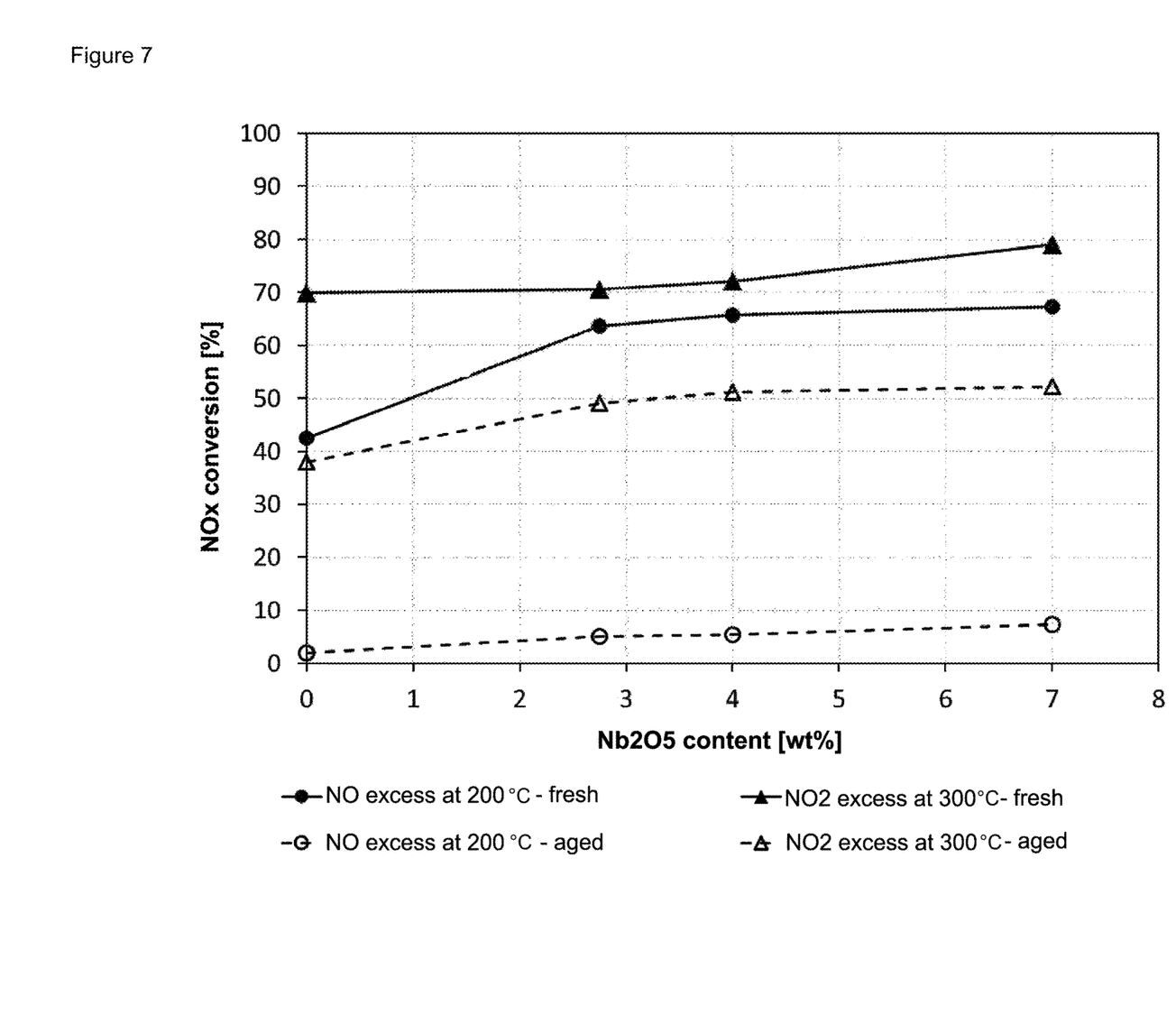
FIG. 7: Nitrogen oxide conversions in the standard SCR reaction at 200° C. and fast SCR reaction at 300° C. versus the $Nb_2O_5$ content, measured at catalyst K1 according to the present invention in comparison to the comparative catalysts VK2, VK8, and VK9 in the fresh and aged states.

The influence of the $Nb_2O_5$ content of the catalyst on the NOx conversion in the standard SCR reaction at 200° C. and in the fast SCR reaction at 300° C. in the fresh and aged states is shown in Table 6. The amounts of $V_2O_5$, $WO_3$, and $CeO_2$ were held constant at 3.75 wt %, 1.00 wt %, and 2.00 wt %, respectively, while the $Nb_2O_5$ content was varied from 0.00 wt % (VK2) to 2.75 wt % (K1), 4.00 wt % (VK8), and 7.00 wt % (VK9).

TABLE 6

Influence of $Nb_2O_5$ Content on NOx Conversion
Influence of $Nb_2O_5$ content on NOx conversion

| $Nb_2O_5$ content | In the standard SCR reaction at 200° C. | | In the fast SCR reaction at 300° C. | |
|---|---|---|---|---|
| [wt %] | fresh | aged | fresh | aged |
| 0 | 42.6 | 2.0 | 69.9 | 38.1 |
| 2.75 | 63.6 | 5.1 | 70.5 | 49.1 |
| 4 | 65.6 | 5.4 | 72.2 | 51.2 |
| 7 | 67.2 | 7.3 | 79.1 | 52.2 |

The results of the influence of the $Nb_2O_5$ content are shown in FIG. 7.

The invention claimed is:
1. A catalyst comprising
at least one oxide of vanadium in an amount of 2 to 6 wt %,
at least one oxide of cerium in an amount of 2 to 4 wt %,
at least one oxide of niobium in an amount of 1 to 7 wt %,
up to 2 wt % of at least one oxide of tungsten, and
at least one oxide of titanium as a carrier material in an amount measured so as to result in a total of 100 wt %,
wherein, in each case, the wt % is based on the total weight of the catalyst and calculated as $V_2O_5$, $WO_3$, $CeO_2$, $Nb_2O_5$, or $TiO_2$.

2. The catalyst according to claim 1, wherein the catalyst contains at least one oxide of silicon.

3. The catalyst according to claim 1, wherein the catalyst contains at least one oxide of molybdenum, antimony, zirconium, tantalum, and/or hafnium.

4. The catalyst according to claim 1, wherein the catalyst contains at least one oxide of silicon in amounts of 2 to 7 wt %, relative to the weight of the catalyst and calculated as $SiO_2$.

5. The catalyst according to claim 1, wherein the catalyst contains at least one oxide of molybdenum, antimony, zirconium, tantalum, and/or hafnium in a total amount of said oxides of 0.5 to 20 wt %, based on to the total weight of the catalyst and calculated as $MoO_3$, $Sb_2O_5$, $ZrO_2$, $Ta_2O_5$, or $HfO_2$.

6. The catalyst according to claim 1, wherein the catalyst is present in the form of a coating on a carrier body.

7. The catalyst according to claim 1, wherein the catalyst is present as part of a carrier body.

8. A method for the reduction of nitrogen oxides in exhaust gases of lean-burn internal combustion engines, comprising the steps of
adding a reducing agent to the exhaust-gas-containing nitrogen oxides, and
passing the resulting mixture of exhaust-gas-containing nitrogen oxides and reducing agent over a catalyst according to claim 1.

9. An exhaust gas cleaning system for treating diesel exhaust gas, comprising
an oxidation catalyst,
a diesel particle filter, and
a catalyst according to claim 1, or
an oxidation catalyst and
a diesel particle filter on which the catalyst according to claim 1 is present as a coating.

10. A catalyst consisting of
at least one oxide of vanadium in an amount of 2 to 6 wt %,
at least one oxide of cerium in an amount of 2 to 4 wt %,
at least one oxide of niobium in an amount of 1 to 7 wt %,
at least one oxide of titanium as carrier material in an amount measured so as to result in a total of 100 wt %, and
optionally (a) at least one oxide of silicon in amounts of 2 to 7 wt %, (b) 0.001 to 2 wt % an oxide of tungsten, and/or (c) at least one oxide of molybdenum, antimony, zirconium, tantalum, and/or hafnium in a total amount of said oxides of 0.5 to 20 wt %, wherein, in each case, the wt % is based on the total weight of the catalyst and calculated as $V_2O_5$, $CeO_2$, $Nb_2O_5$, $TiO_2$, $SiO_2$, $WO_3$, $MoO_3$, $Sb_2O_5$, $ZrO_2$, $Ta_2O_5$, or $HfO_2$.

11. The catalyst according to claim 10, wherein the oxide of tungsten is present in an amount of 0.5 to 2 wt %, calculated as $WO_3$ and based on the total weight of the catalyst.

12. The catalyst according to claim 10, wherein it is present in the form of a coating on a carrier body.

13. The catalyst according to claim 10, wherein it is present as part of a carrier body.

14. A method for the reduction of nitrogen oxides in exhaust gases of lean-burn internal combustion engines, comprising the method steps of
adding a reducing agent to the exhaust-gas-containing nitrogen oxides, and
passing the resulting mixture of exhaust-gas-containing nitrogen oxides and reducing agent over a catalyst according to claim 10.

15. An exhaust gas cleaning system for treating diesel exhaust gas, comprising
an oxidation catalyst,
a diesel particle filter, and
a catalyst according to claim 10, or
an oxidation catalyst and
a diesel particle filter on which a catalyst according to claim 10 is present as a coating.

* * * * *